(12) United States Patent
Vasques

(10) Patent No.: US 10,519,741 B2
(45) Date of Patent: Dec. 31, 2019

(54) ANNULAR BARRIER AND DOWNHOLE SYSTEM FOR LOW PRESSURE ZONE

(71) Applicant: Welltec Oilfield Solutions AG, Zug (CH)

(72) Inventor: Ricardo Reves Vasques, Allerød (DK)

(73) Assignee: Welltec Oilfield Solutions AG, Zug (CH)

( * ) Notice: Subject to any disclaimer, the term of this patent is extended or adjusted under 35 U.S.C. 154(b) by 307 days.

(21) Appl. No.: 15/415,222

(22) Filed: Jan. 25, 2017

(65) Prior Publication Data

US 2017/0211347 A1    Jul. 27, 2017

(30) Foreign Application Priority Data

Jan. 26, 2016   (EP) ..................................... 16152790
Feb. 1, 2016    (EP) ..................................... 16153706

(51) Int. Cl.
*E21B 33/127*    (2006.01)
*E21B 33/14*     (2006.01)
(Continued)

(52) U.S. Cl.
CPC ............ *E21B 33/127* (2013.01); *E21B 21/08* (2013.01); *E21B 23/01* (2013.01); *E21B 23/04* (2013.01);
(Continued)

(58) Field of Classification Search
CPC . E21B 7/20; E21B 23/01; E21B 23/04; E21B 23/06; E21B 3/12; E21B 3/127;
(Continued)

(56) References Cited

U.S. PATENT DOCUMENTS

| 3,503,445 A | * | 3/1970 | Cochrum ............... E21B 21/103 166/151 |
| 3,908,769 A | | 9/1975 | Schuyf et al. |
| 3,941,190 A | | 3/1976 | Conover |
| 4,653,588 A | | 3/1987 | White |

(Continued)

FOREIGN PATENT DOCUMENTS

| EP | 2 947 259 A1 | 11/2015 |
| WO | WO 2014/154480 | 10/2014 |

OTHER PUBLICATIONS

Search Report for EP 16152790.8, dated Sep. 26, 2016, 9 pages.
(Continued)

*Primary Examiner* — Kristyn A Hall
*Assistant Examiner* — Tara E Schimpf
(74) *Attorney, Agent, or Firm* — Nixon & Vanderhye P.C.

(57) ABSTRACT

An annular barrier for being expanded in an annulus includes a tubular part mounted as part of the well tubular structure, the tubular part including an opening and an inside having an inside pressure, an expandable metal sleeve surrounding the tubular part and having an inner face facing the tubular part and an outer face facing the wall of the borehole, each end of the expandable metal sleeve being connected with the tubular part, an annular space between the inner face of the expandable metal sleeve and the tubular part, and a valve system having a first valve and a second valve, the second valve allowing pressurised fluid into the annular space to expand the expandable metal sleeve and preventing fluid from flowing from the annular space to the inside of the tubular part.

15 Claims, 13 Drawing Sheets

(51) Int. Cl.
  *E21B 34/10* (2006.01)
  *E21B 21/08* (2006.01)
  *E21B 23/06* (2006.01)
  *E21B 23/01* (2006.01)
  *E21B 23/04* (2006.01)
  *E21B 33/13* (2006.01)
  *E21B 33/12* (2006.01)

(52) U.S. Cl.
  CPC .............. *E21B 23/06* (2013.01); *E21B 33/12* (2013.01); *E21B 33/13* (2013.01); *E21B 33/14* (2013.01); *E21B 34/10* (2013.01); *E21B 34/101* (2013.01); *E21B 34/102* (2013.01)

(58) Field of Classification Search
  CPC .......... E21B 3/1272; E21B 3/13; E21B 34/10; E21B 34/101; E21B 34/102; E21B 33/12; E21B 33/127; E21B 33/1272; E21B 33/13
  See application file for complete search history.

(56) References Cited

U.S. PATENT DOCUMENTS

| | | | |
|---|---|---|---|
| 4,659,530 A | 4/1987 | Boyers et al. | |
| 8,291,984 B2 * | 10/2012 | Saltel | E21B 33/127 166/319 |
| 2004/0055749 A1 * | 3/2004 | Lonnes | E21B 23/04 166/298 |
| 2014/0216755 A1 * | 8/2014 | Hallundæk | E21B 23/06 166/373 |
| 2016/0053568 A1 * | 2/2016 | Saltel | E21B 23/06 166/179 |

OTHER PUBLICATIONS

International Search Report and Written Opinion dated Apr. 13, 2017 in International Application No. PCT/EP2017/051537 (14 pages).

International Preliminary Report on Patentability dated Aug. 9, 2018 in International Application No. PCT/EP2017/051537 (9 pages).

* cited by examiner

ANNULAR BARRIER AND DOWNHOLE SYSTEM FOR LOW PRESSURE ZONE

This application claims priority to EP Patent Application No. 16152790.8 filed 26 Jan. 2016, and EP Patent Application No. 16153706.3 filed 1 Feb. 2016, the entire contents of each of which are hereby incorporated by reference.

FIELD OF THE INVENTION

The present invention relates to an annular barrier for being expanded in an annulus between a well tubular structure and a wall of a borehole downhole for isolating a first zone from a second zone in the annulus between the well tubular structure and the wall of the borehole, the annulus having an annulus pressure. The invention also relates to a downhole system, and finally the present invention relates to a drilling method for drilling past a low pressure zone in a formation.

BACKGROUND ART

When drilling a new borehole or a lateral in an existing well, the drilling head may drill into a very low pressure zone, resulting in a loss of pressure in the borehole. Thus, the mud entered into the hole while drilling to prevent blowout is lost in the low pressure zone, and there will be a substantial risk of a blowout if the drilling is continued. Cementing and thus sealing part of the annulus above the low pressure zone is also impossible, since the injected cement is lost in the same way as the mud as it disappears into the low pressure zone, and then this partly drilled borehole is abandoned and plugged from above and a new well is drilled.

Expanding and thereby setting an annular barrier in such a very low pressure zone by pressurising the inside of the well tubular structure opposite the annular barrier may not be successful. This is due to the fact that the expansion opening in the well tubular structure needs to be closed off after expansion, and the prior art closing mechanisms either close before the annular barrier is expanded or do not close at all due to the lack of pressure in the annulus. The prior art closing mechanisms rely on the annulus pressure to shift valve position and close the expansion opening and open fluid communication to the annulus, and when the annulus pressure suddenly becomes so low as is the case when drilling into the very low pressure zone, the pressure in the annulus cannot build up to a level high enough to shift the position of the closing mechanism which is normally done just after expansion or at least when equalisation of the pressure between the annulus and the inside of the annular barrier is required. Another risk is that the closing mechanism closes before the expansion has ended as some closing mechanisms rely on a shear pin to break after expansion, and since such shear pin is selected so that it breaks at a certain differential pressure and not at an absolute pressure, and the shear pin is selected so that it breaks when the pressure inside the well tubular structure is above a predetermined expansion pressure, the shear pin may break in the initial phase of the expansion process when the annulus pressure is very low, creating a high pressure difference across the shear pin so that it will shear too early and thus close the expansion opening before the expansion has even started.

SUMMARY OF THE INVENTION

It is an object of the present invention to wholly or partly overcome the above disadvantages and drawbacks of the prior art. More specifically, it is an object to provide an improved annular barrier for a completion or drilling system which renders it possible to continue drilling past the above-mentioned very low pressure zone.

The above objects, together with numerous other objects, advantages and features, which will become evident from the below description, are accomplished by a solution in accordance with the present invention by an annular barrier for being expanded in an annulus between a well tubular structure and a wall of the borehole downhole for isolating a first zone from a second zone in the annulus between the well tubular structure and the wall of the borehole, the annulus having an annulus pressure, comprising:

a tubular part for being mounted as part of the well tubular structure, the tubular part comprising an opening and an inside having an inside pressure, an expandable sleeve surrounding the tubular part and having an inner face facing the tubular part and an outer face facing the wall of the borehole, each end of the expandable sleeve being connected with the tubular part, an annular space between the inner face of the expandable sleeve and the tubular part, the annular space having a space pressure, and a valve system comprising a first valve and a second valve, the second valve allowing pressurised fluid into the annular space to expand the expandable sleeve and prevent the fluid from flowing from the annular space to the inside of the tubular part, wherein the first valve has a first position allowing fluid communication between the inside of the tubular part and the second valve to expand the expandable sleeve, and a second position providing fluid communication between the annular space and the annulus and closing the fluid communication between the inside of the tubular part and the annular space by means of a pressure difference between the inside and the annular space independently of the annulus pressure.

The present invention also relates to an annular barrier for being expanded in an annulus between a well tubular structure and a wall of a borehole downhole for isolating a first zone from a second zone in the annulus between the well tubular structure and the wall of the borehole, the annulus having an annulus pressure, comprising:

a tubular part for being mounted as part of the well tubular structure, the tubular part comprising an opening and an inside having an inside pressure, an expandable metal sleeve surrounding the tubular part and having an inner face facing the tubular part and an outer face facing the wall of the borehole, each end of the expandable metal sleeve being connected with the tubular part, an annular space between the inner face of the expandable metal sleeve and the tubular part, the annular space having a space pressure, and a valve system comprising a first valve and a second valve, the second valve allowing pressurised fluid into the annular space to expand the expandable metal sleeve and preventing fluid from flowing from the annular space to the inside of the tubular part, wherein the first valve has a first position allowing fluid communication between the inside of the tubular part and the second valve in order to expand the expandable metal sleeve when increasing the inside pressure, and a second position providing fluid communication between the annular space and the annulus, wherein the first valve is configured to shift from the first position to the second position when the space pressure is higher than the inside pressure.

Also, the second position may provide fluid communication between the annular space and the annulus and close the fluid communication between the inside of the tubular part and the annular space.

By having a first valve shifting position by means of the pressure difference between the inside of the tubular part and the annular space independently of the annulus pressure, the annular barrier is able to be fully expanded also in or above a low pressure zone. The closing of the expansion opening and thus the closing of fluid communication to the inside of the well tubular structure is therefore also performed independently of the annulus pressure, and thus unintentional closing before or during expansion is prevented. Further, the situation in which the expansion opening is not closed at all in the event of low pressure in the annulus, is also avoided.

The second valve may be arranged in a channel fluidly connecting the expansion opening with the annular space.

Furthermore, the first valve may be arranged in parallel to the second valve.

Also, the first valve may comprise a chamber and a piston dividing the chamber into a first chamber section and a second chamber section and the piston may be movable within the chamber to shift position.

Moreover, the second chamber section may be in fluid communication with the annular space in the first position of the first valve.

Further, the first chamber section may be in fluid communication with the inside of the tubular part in the first position of the first valve.

Additionally, the first valve may have a first aperture being in fluid communication with the inside, a second aperture being in fluid communication with the second valve, a third aperture being in fluid communication with the annular space and a fourth aperture being in fluid communication with the annulus, and in the first position the first aperture may be in fluid communication with the second aperture, and in the second position the third aperture may be in fluid communication with the fourth aperture.

Furthermore, the piston may comprise a fluid channel providing fluid communication between the third aperture and the second chamber section in the first position.

The piston mentioned above may have a first end face facing the first chamber section and a second piston face facing the second chamber section.

Moreover, the fluid channel may provide fluid communication between the annular space and the second chamber section in the first position so that the space pressure may act on the second end face of the piston.

Furthermore, the pressure difference between the first chamber section and the second chamber section may move the piston to shift position of the first valve.

The first end face may have an outer diameter being substantially equal to an outer diameter of the second end face.

The outer diameter of the first end face and the second end face may correspond to an inner diameter of the chamber.

Also, the piston may have a recess providing fluid communication between the third aperture and the fourth aperture in the second position.

The recess may be annular.

Also, the piston may have sealing elements.

Furthermore, the second valve may be a ball valve or a check valve.

In addition, the first valve may comprise a shear pin extending into the piston to maintain the piston in the first position until a predetermined pressure difference is reached.

The annular barrier according to the present invention may further comprise an anti-collapsing unit comprising an element movable at least between a first position and a second position, the anti-collapsing unit having a first port which is in fluid communication with the first zone of the annulus, and a second port which is in fluid communication with the second zone of the annulus, and the anti-collapsing unit having a third port which is in fluid communication with the annular space, and in the first position, the first port may be in fluid communication with the third port, equalising the pressure of the first zone with the space pressure, and in the second position, the second port may be in fluid communication with the third port, equalising the pressure of the second zone with the space pressure.

In addition, the anti-collapsing unit may comprise a shuttle valve and the element may be comprised in the shuttle valve.

The annular barrier according to the invention may furthermore comprise a locking element adapted to mechanically lock the piston when the piston is in the closed position, blocking the first opening.

Also, the locking element may be configured to move at least partly radially outwards or inwards upon movement of the piston away from the first position to prevent the piston from returning to the first position of the piston.

Moreover, the locking element may permanently lock the piston in a closed position.

Furthermore, the shear pin may extend through the locking element and the piston.

The annular barrier according to the present invention may also comprise a cement port or a fracturing port.

The invention also relates to a downhole system for completing a well in a formation having layers of varying pressures, comprising:
 a well tubular structure, and
 at least one annular barrier according to the invention.

Further, the well tubular structure may be a drilling liner connected with a drilling head in a first end.

Also, the annular barrier may be arranged closer to the first end than to the second end of the well tubular structure.

Furthermore, the well tubular structure may be a production casing.

Finally, the present invention relates to a drilling method for drilling past a low pressure zone in a formation, comprising:
 drilling a borehole in the formation,
 determining a low pressure zone in the formation,
 dropping a closing element into the well tubular structure,
 increasing the inside pressure of the well tubular structure and expanding an annular barrier according to the invention in the low pressure zone, and
 decreasing the inside pressure to a pressure below the space pressure and shifting the position of the first valve from the first position to the second position.

The drilling method mentioned above may further comprise equalising the pressure between the annulus and the annular space.

Also, the drilling method may comprise providing cement above the annular barrier in an annulus between the casing and a wall of the borehole.

Furthermore, the drilling method described above may further comprise:

oscillating or rotating at least part of the casing in relation to the annular barrier while cementing, after expansion of the expandable metal sleeve, and drilling past the low pressure zone.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
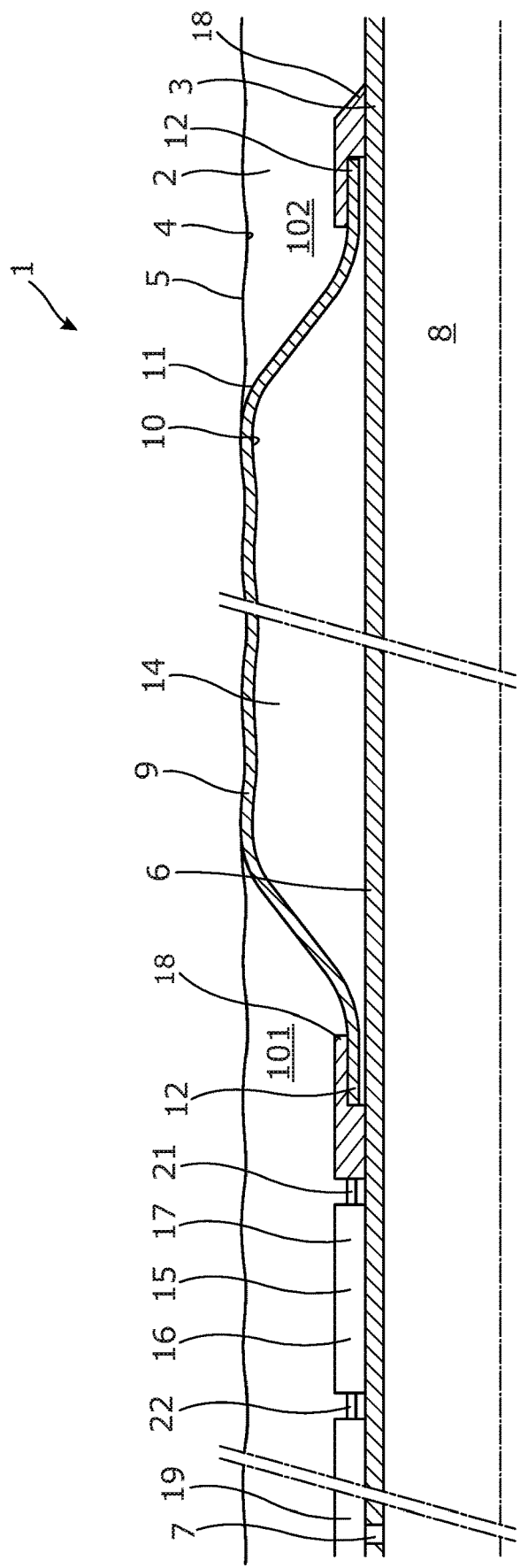
FIG. 1 shows a cross-sectional view of an annular barrier according to the invention.

FIG. 1 shows an annular barrier 1 which has been expanded in an annulus 2 between a well tubular structure 3 and a wall 4 of a borehole 5 downhole for isolating a first zone 101 from a second zone 102 in the annulus between the well tubular structure and the wall of the borehole. The annular barrier 1 comprises a tubular part 6 mounted as part of the well tubular structure and comprises an opening 7 and an inside 8 with an inside pressure. The annular barrier 1 comprises an expandable metal sleeve 9 surrounding the tubular part 6 and having an inner face 10 facing the tubular part and an outer face 11 facing the wall 4 of the borehole 5. Each end 12 of the expandable metal sleeve 9 is connected with the tubular part 6 forming an annular space 14 between the inner face of the expandable metal sleeve and the tubular part 6. The annular barrier further comprises a valve system 15 comprising a first valve 16 and a second valve 17. The second valve 17 allows pressurised fluid into the annular space 14 to expand the expandable metal sleeve 9 and prevents the pressurised fluid from flowing from the annular space 14 back into the inside 8 of the tubular part 6. The first valve 16 has a first position allowing fluid communication between the inside of the tubular part 6 and the second valve 17 to expand the expandable metal sleeve 9 when the inside pressure is increased to an expansion pressure, and the first valve 16 has a second position providing fluid communication between the annular space 14 and the annulus 2 and closing the fluid communication between the inside of the tubular part 6 and the annular space by means of a pressure difference between the inside of the tubular part 6 and the annular space 14 independently of the annulus pressure. Thus, during expansion the inside pressure of the tubular part is greater than the annulus pressure, but if the pressure in the annulus is very low, such as in a low pressure zone in the formation where loss of pressure has occurred, the position of the first valve 16 can still be shifted by decreasing the inside pressure and using the space pressure, being equal to the expansion pressure, to shift from the first position to the second position. The annular barrier 1 can therefore be expanded and the first valve can subsequently be shifted from the expansion position to the second position and in the second position the pressure in the annular space and the annulus can be equalised and the fluid communication to the inside of the tubular part has been shut off. The space pressure in the annular space is thus used to shift position of the first valve.

Figure 2:
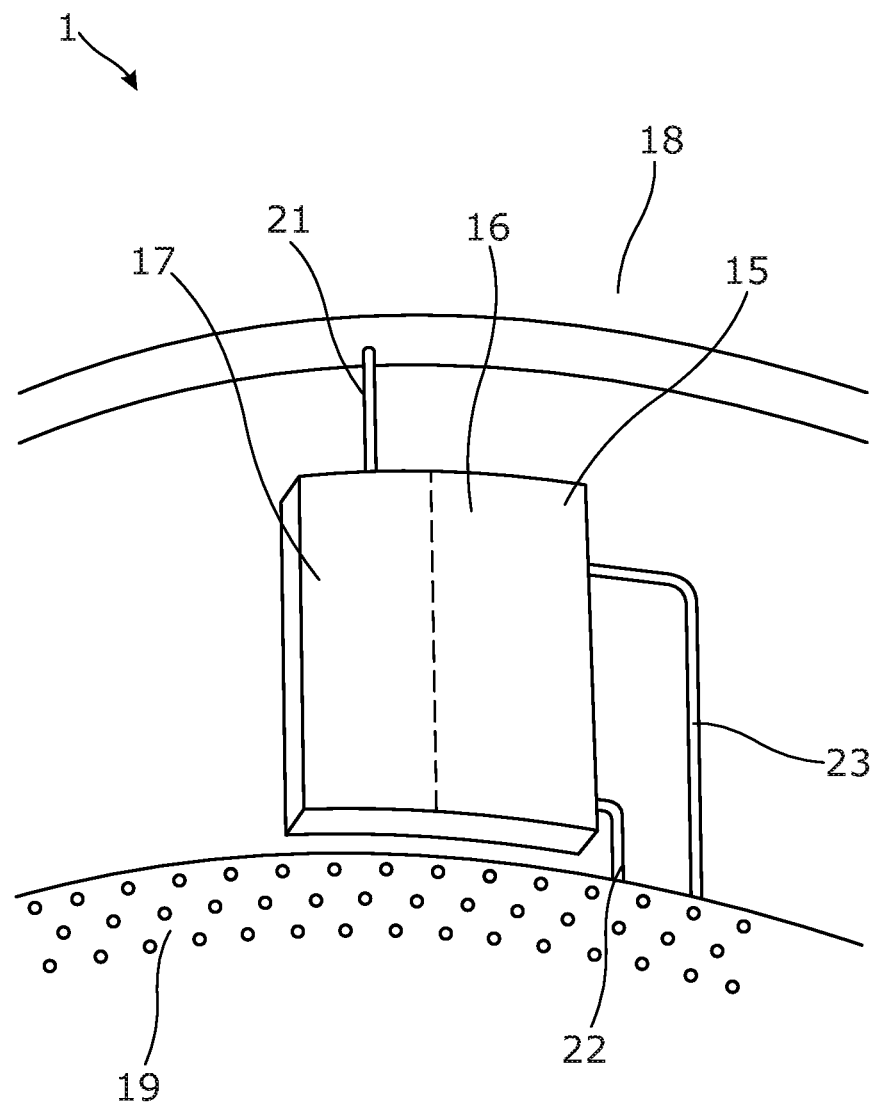
FIG. 2 shows part of the annular barrier in perspective.

The expandable metal sleeve 9 is connected to the tubular part 6 by means of connection part 18, and the valve system 15 is fluidly connected to the connection part 18 by means of a first tube 21, as shown in FIGS. 1 and 2. The opening 7 in the tubular part 6 is arranged opposite a screen 19, so that the fluid during expansion flows through the opening 7 through the screen 19 into the valve system 15 through a second tube 22 and into the annular space 14 through the first tube 21, as shown in FIG. 1. When equalising the pressure between the annulus 2 and the annular space 14, the fluid flows through the screen in through a third tube 23 (shown in FIG. 2) past the valve system 15 into the annular space through the first tube 21 if the annulus pressure is higher than the space pressure, and vice versa if the space pressure is higher than the annulus pressure.

Figure 3:
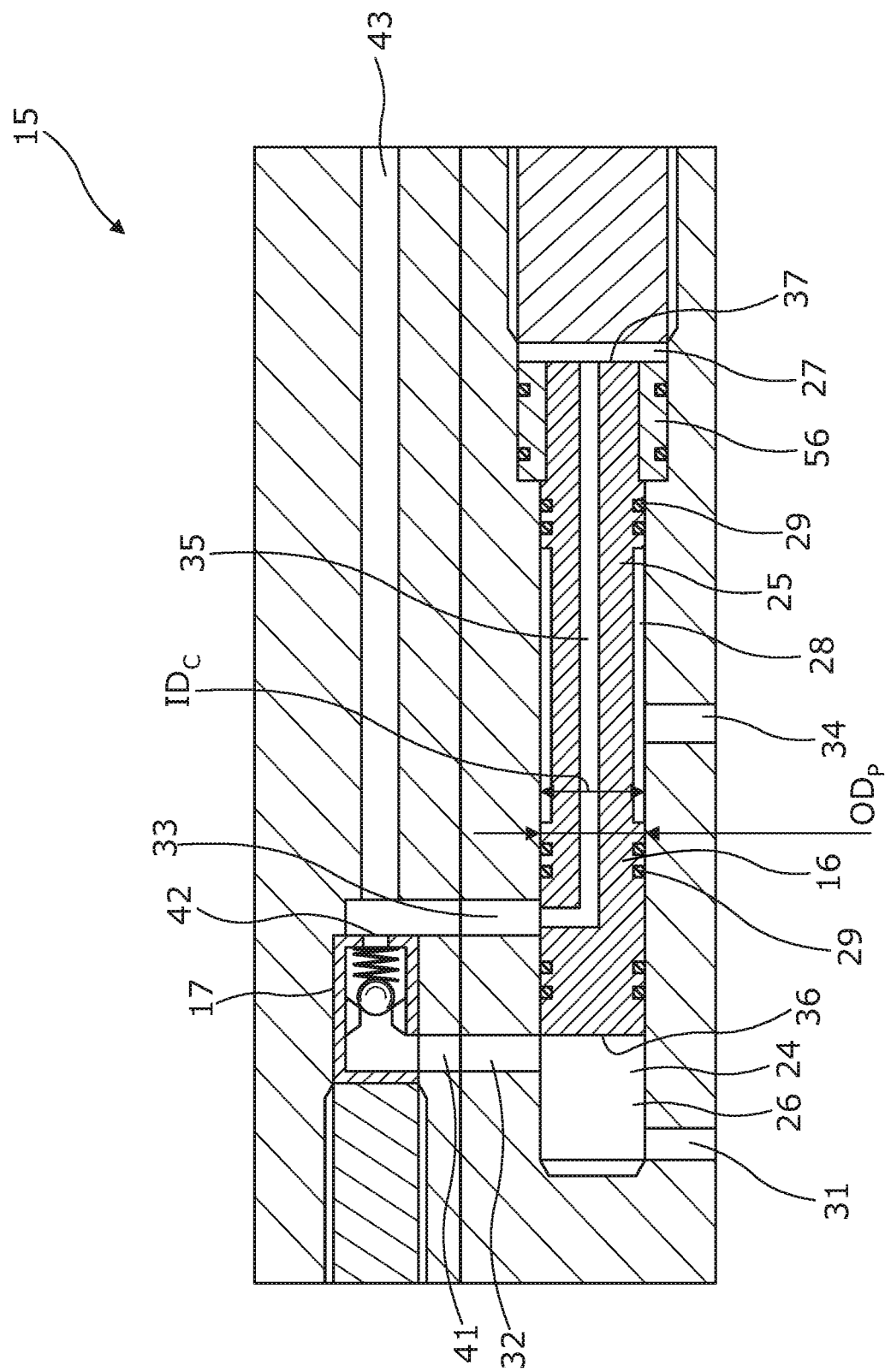
FIG. 3 shows a cross-sectional view of a valve system in a first position.
Figure 4:
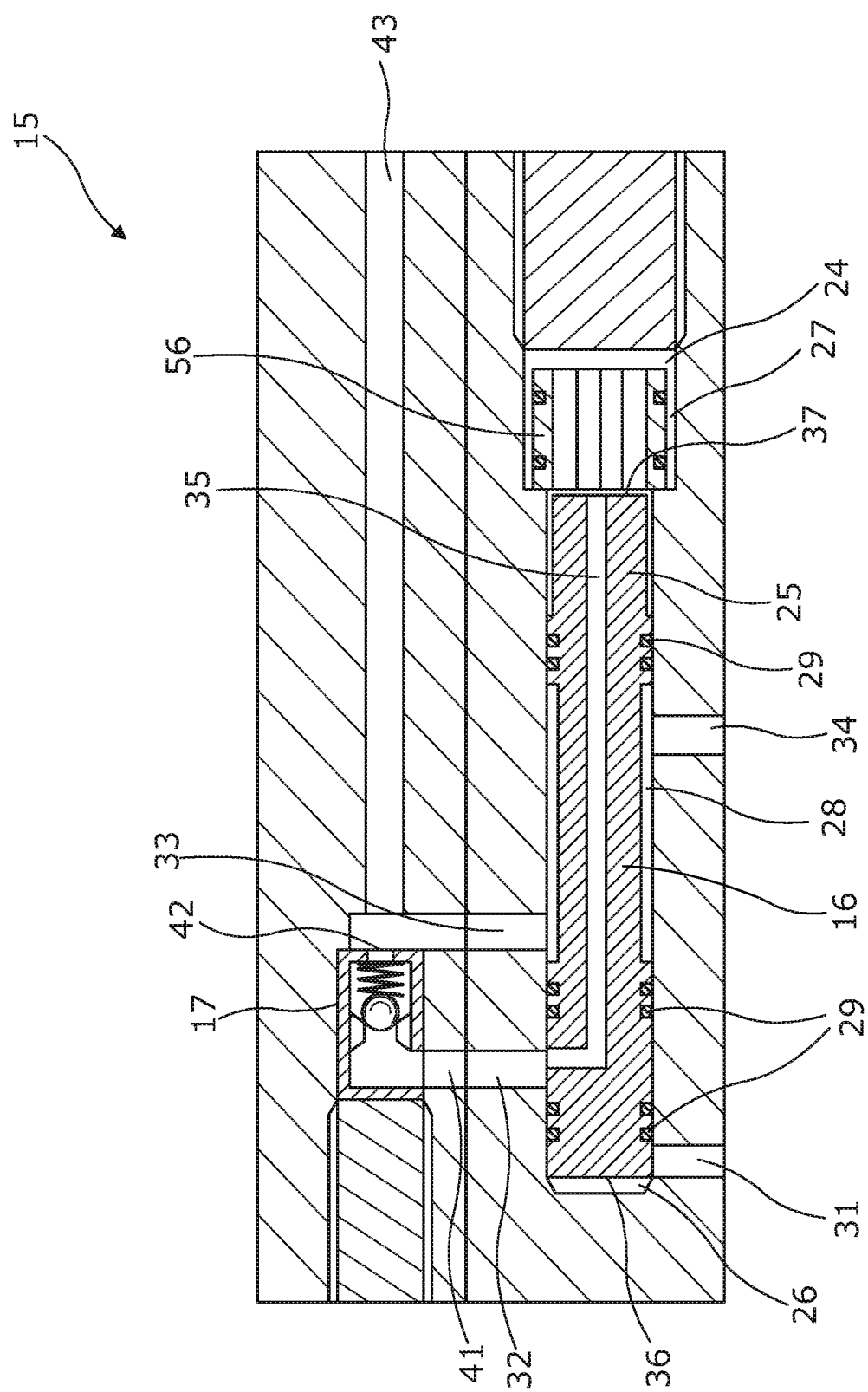
FIG. 4 shows a cross-sectional view of the valve system of FIG. 3 in a second position.

In FIG. 3, the first valve 16 comprises a chamber 24 and a piston 25 dividing the chamber into a first chamber section 26 and a second chamber section 27. The piston is movable within the chamber to shift position between the first position, which is shown in FIG. 3, and the second position, which is shown in FIG. 4. The first valve 16 has a first aperture 31 being in fluid communication with the inside of the tubular part, a second aperture 32 being in fluid communication with an inlet 41 of the second valve, a third aperture 33 being in fluid communication with the annular space and a fourth aperture 34 being in fluid communication with the annulus. In the first position, the first aperture is in fluid communication with the second aperture, and in the second position the third aperture is in fluid communication with the fourth aperture. As can be seen in FIGS. 3 and 4, the second aperture 32 is aligned with an inlet 41 of the second valve 17, and the third aperture 33 is in fluid communication with an outlet 42 of the second valve. The outlet 42 is furthermore in fluid communication with the annular space by a channel 43.

The piston 25 comprises a fluid channel 35 providing fluid communication between the third aperture 33 and the second chamber section 27 in the first position. The piston 25 has a first end face 36 facing the first chamber section 26 and a second end face 37 facing the second chamber section 27. The fluid channel 35 provides fluid communication between the annular space and the second chamber section 27 in the first position, so that the space pressure acts on the second end face 37 of the piston and presses the piston to move if the space pressure is higher than the inside pressure of the tubular part. Thus, it is the pressure difference between the first chamber section and the second chamber section that moves the piston 25 to shift position of the first valve. As can be seen in FIG. 3, the first end face 36 has an outer diameter $OD_p$ corresponding to an inner diameter $ID_c$ of the chamber 24. In FIG. 3, the outer diameter $OD_p$ of the first end face 36 is larger than an outer diameter of the second end face, but may in another embodiment, shown in FIG. 7, be substantially equal to the outer diameter of the second end face 37.

The piston 25 has a recess 28 providing fluid communication between the third aperture 33 and the fourth aperture 34 in the second position of the first valve 16. The recess is annular so that the fluid can flow freely around the piston. The piston has several sealing elements 29 to fluidly isolate the third aperture 33 in the first position and to fluidly isolate the fourth aperture 34 also in the first position, so that there is no fluid communication between the third aperture 33 and the fourth aperture 34 in the first position, as shown in FIG. 3. In FIG. 4, the sealing elements 29 fluidly isolate the first aperture 31 and they also isolate so that there is no fluid communication between the second aperture 32 and the third aperture 33 and no fluid communication between the second aperture 32 and the fourth aperture 34 through the chamber 24. The second valve is a ball valve or a check valve.

Figure 5:
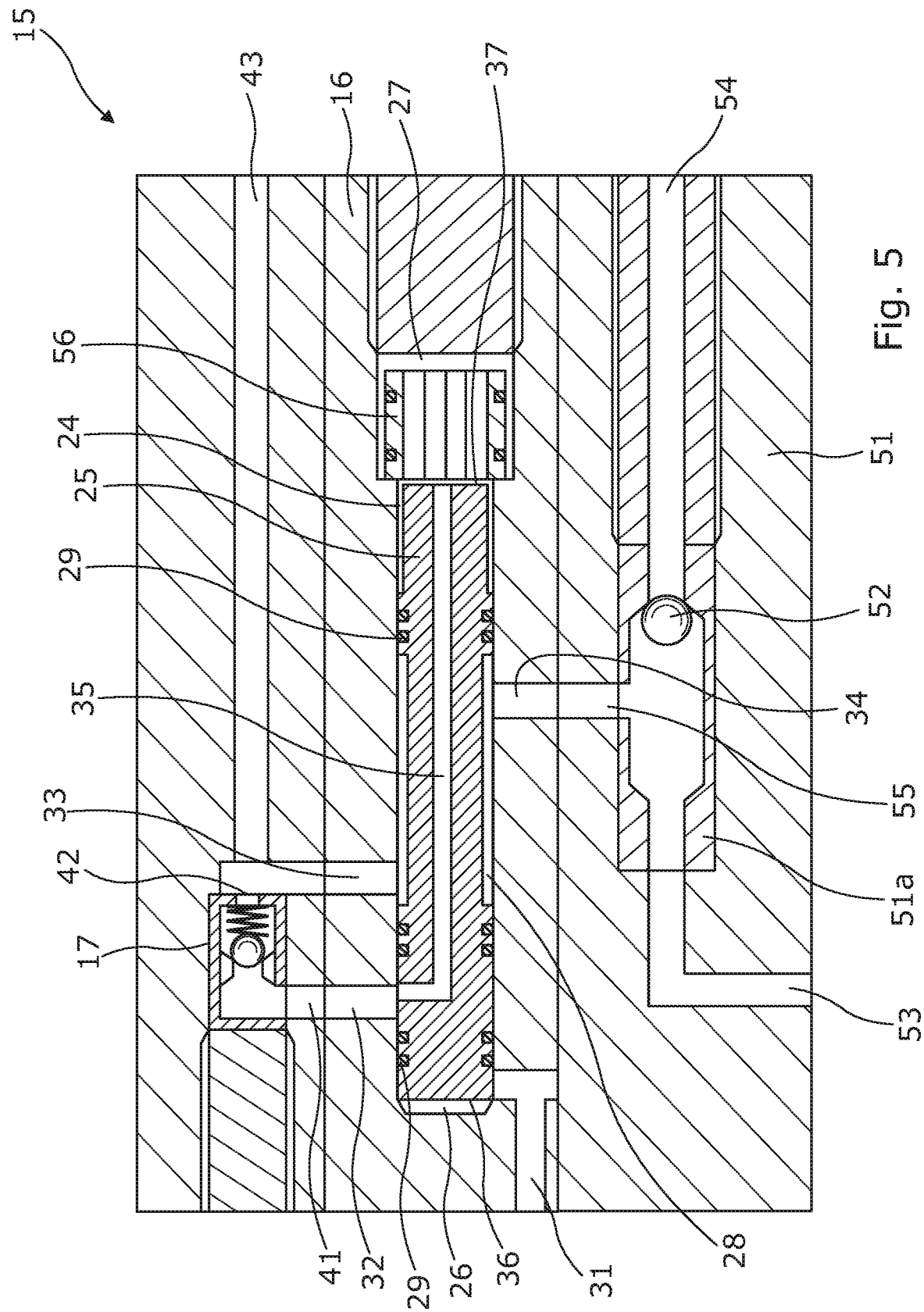
FIG. 5 shows a cross-sectional view of another valve system in the second position.

The annular barrier of FIG. 5 further comprises an anti-collapsing unit 51 comprising an element 52 movable at least between a first position and a second position. The anti-collapsing unit 51 has a first port 53 which is in fluid communication with the first zone of the annulus, and a second port 54 which is in fluid communication with the second zone of the annulus, and the anti-collapsing unit has a third port 55 which is in fluid communication with the annular space. In the first position (as shown) of the anti-collapsing unit 51, the first port 53 is in fluid communication with the third port 55, equalising the pressure of the first zone with the space pressure, and in the second position of the anti-collapsing unit 51, the second port 54 is in fluid communication with the third port 55, equalising the pressure of the second zone with the space pressure. The anti-collapsing unit 51 is in fluid communication with the first zone through the screen, and with the second zone through the inside of the tubular part/well tubular structure or a tube extending through the annular barrier.

Furthermore, the anti-collapsing unit 51 comprises a shuttle valve 51a and the element 52 is comprised in the shuttle valve.

Figure 5A:
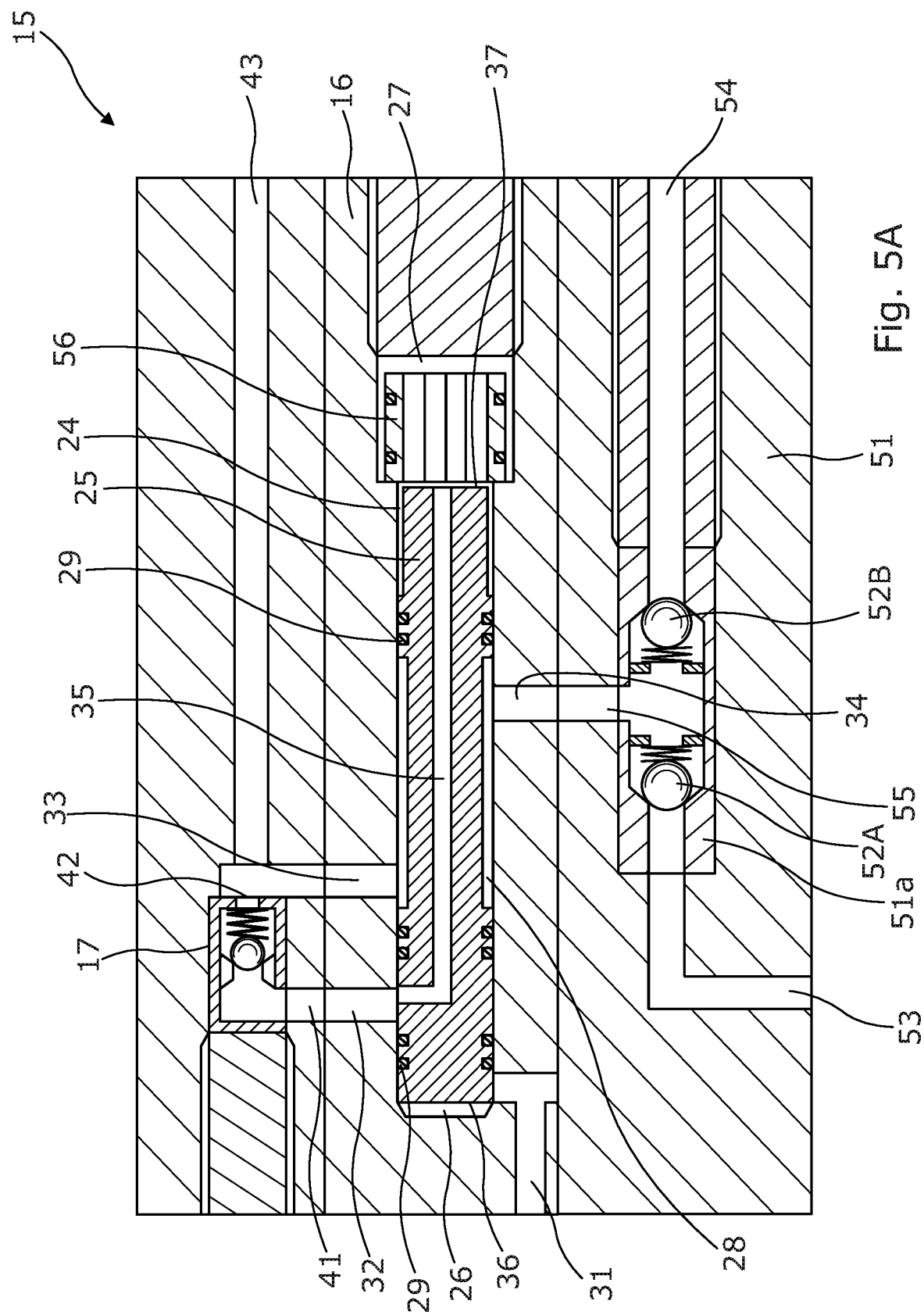
FIG. 5A shows a cross-sectional view of another valve system in the second position.

In FIG. 5A, the anti-collapsing unit 51 has a first unit valve 52A and a second unit valve 52B. The first unit valve 52A allows fluid from the first port 53 in fluid communication with the first zone, to flow into the third port 55 and into the fourth aperture 34 while still preventing the fluid from flowing back out of the first port 53. The second unit valve 52B allows fluid from the second port 54 in fluid communication with the second zone to flow into the third port 55 and the fourth aperture 34 while still preventing the fluid from flowing back out of the second port 54.

In FIGS. 5 and 5A, the annular barrier further comprises a locking element 56 adapted to mechanically lock the piston 25 when the piston is in the second position blocking the first aperture 31. The locking element 56 is configured to move at least partly radially inwards upon movement of the piston away from the first position to prevent the piston from returning to the first position of the piston. Thus, the locking element 56 permanently locks the piston in a closed position being the second position.

Figure 6:
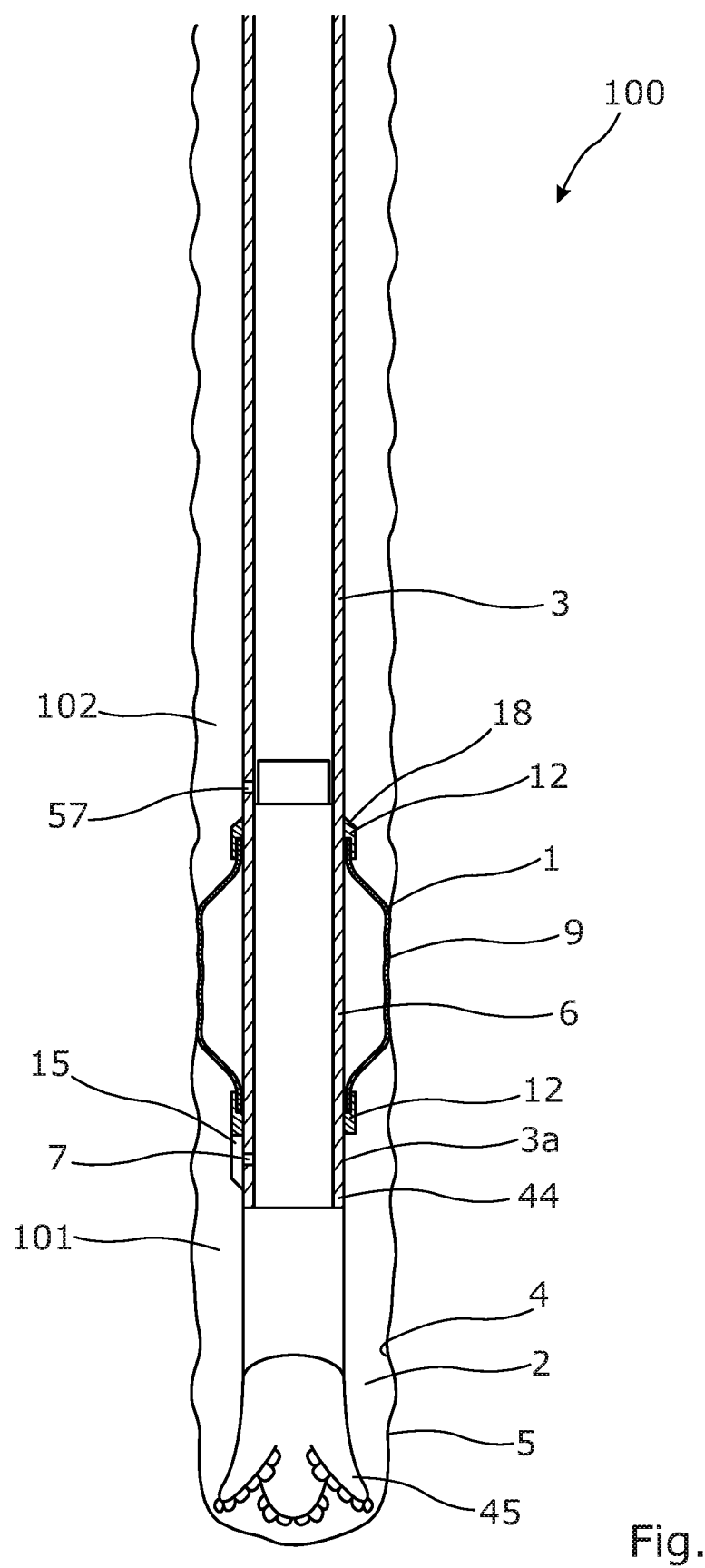
FIG. 6 shows a partly cross-sectional view of a downhole system.

FIG. 6 shows a downhole system 100 for completing a well in a formation having layers of varying pressures. The downhole system 100 comprises the well tubular structure 3 and at least one annular barrier 1. As can be seen, the well tubular structure 3 is a drill string also called a drilling liner 3a connected with a drilling head 45 or bit in a first end 44. The annular barrier is arranged closer to the first end 44 than to a second end of the well tubular structure at the top of the well, e.g. near the Christmas tree, blowout preventer (BOP) and/or well head. When the drilling head or bit drills into a very low pressure zone, thousands of barrels of mud are quickly lost in this zone and in order to stop, the annular barrier is expanded to seal off the low pressure zone, and cement can be ejected into the second zone above the annular barrier through a cement port 57. In this way, the low pressure zone is sealed off and further completion can be initiated, e.g. by drilling further into the formation past the low pressure zone down to the hydro-carbon containing fluid reservoir. Thus, the well tubular structure becomes a production casing or at least an intermediate casing having a production casing arranged therein. The drilling head is thus designed so that it is possible to drill through it and further down the reservoir.

Figure 7:
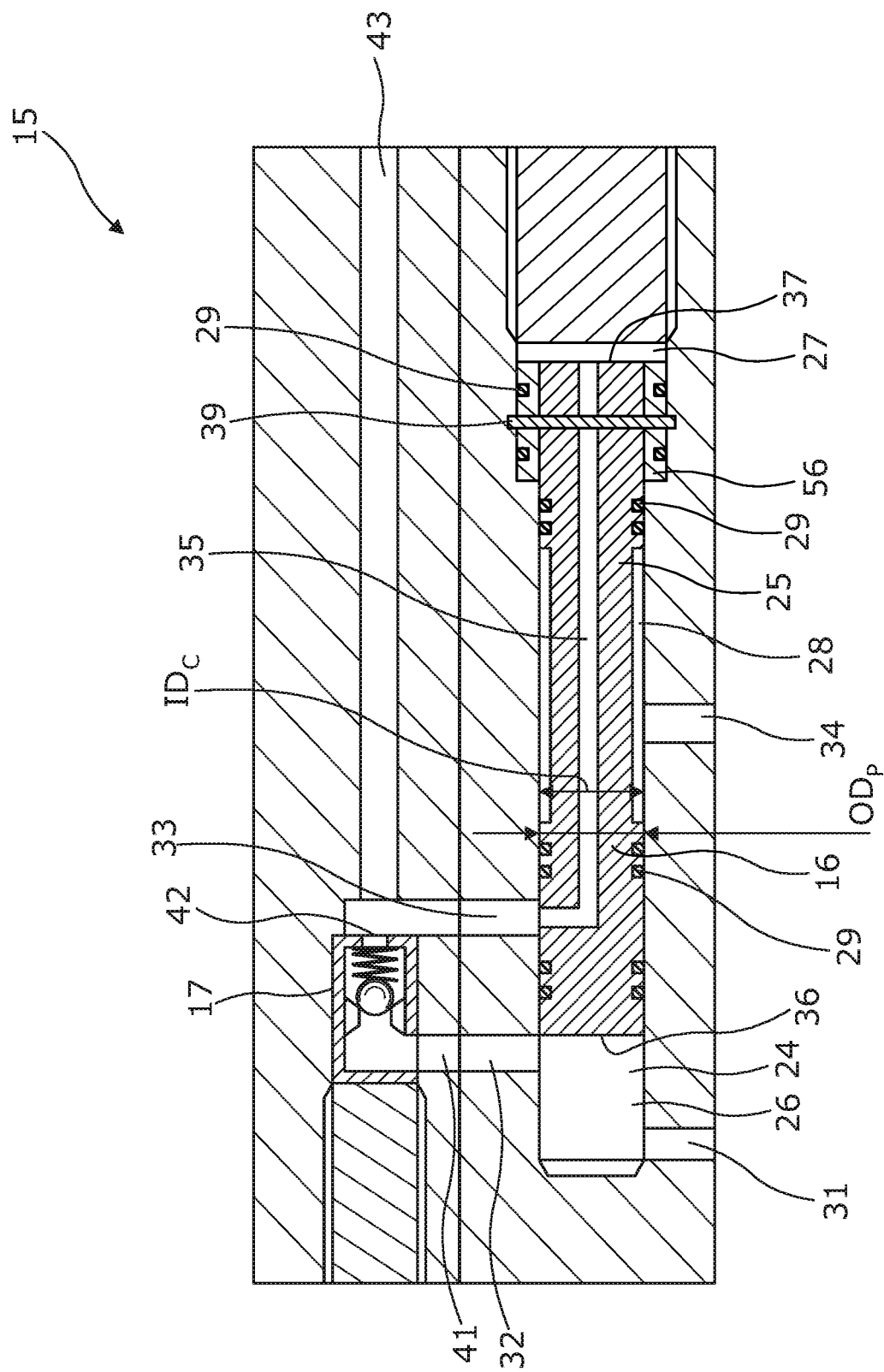
FIG. 7 shows a cross-sectional view of another valve system in the first position.

In FIG. 7, the piston is maintained in the first position by a shear pin 39 which functions as an extra safety precaution. The shear pin 39 shears when the pressure inside the tubular part, and thus the well tubular structure, has reached a level at which the pressure difference between the space pressure and the inside pressure is high enough to shear the shear pin 39. The shear pin will not shear unintentionally when the pressure inside the well tubular structure drops a little bit due to fluctuations in the power supply or in the pump delivery, since the pressure difference will not be high enough; however, the shear pin will hold the piston in the first position so that such small fluctuations will not cause the piston to shift position.

Figure 8A:
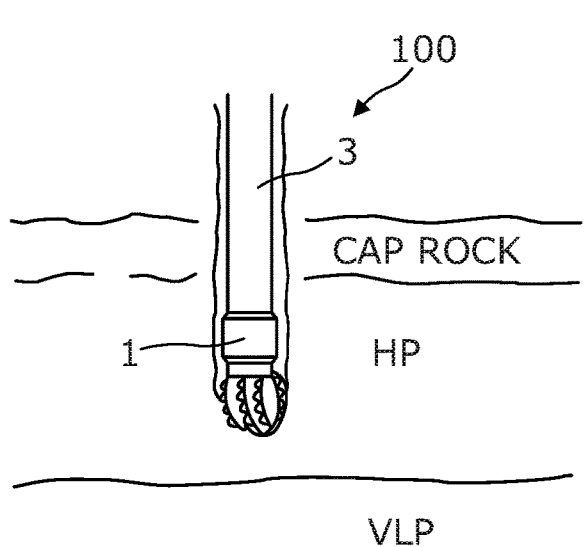
FIGS. 8A-C show the unexpanded annular barrier in the situation when drilling through a high pressure zone.
Figure 8B:
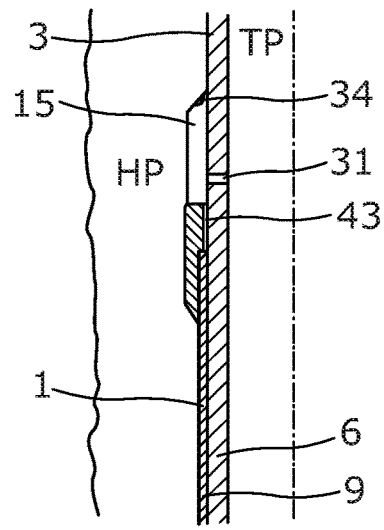
Figure 8C:
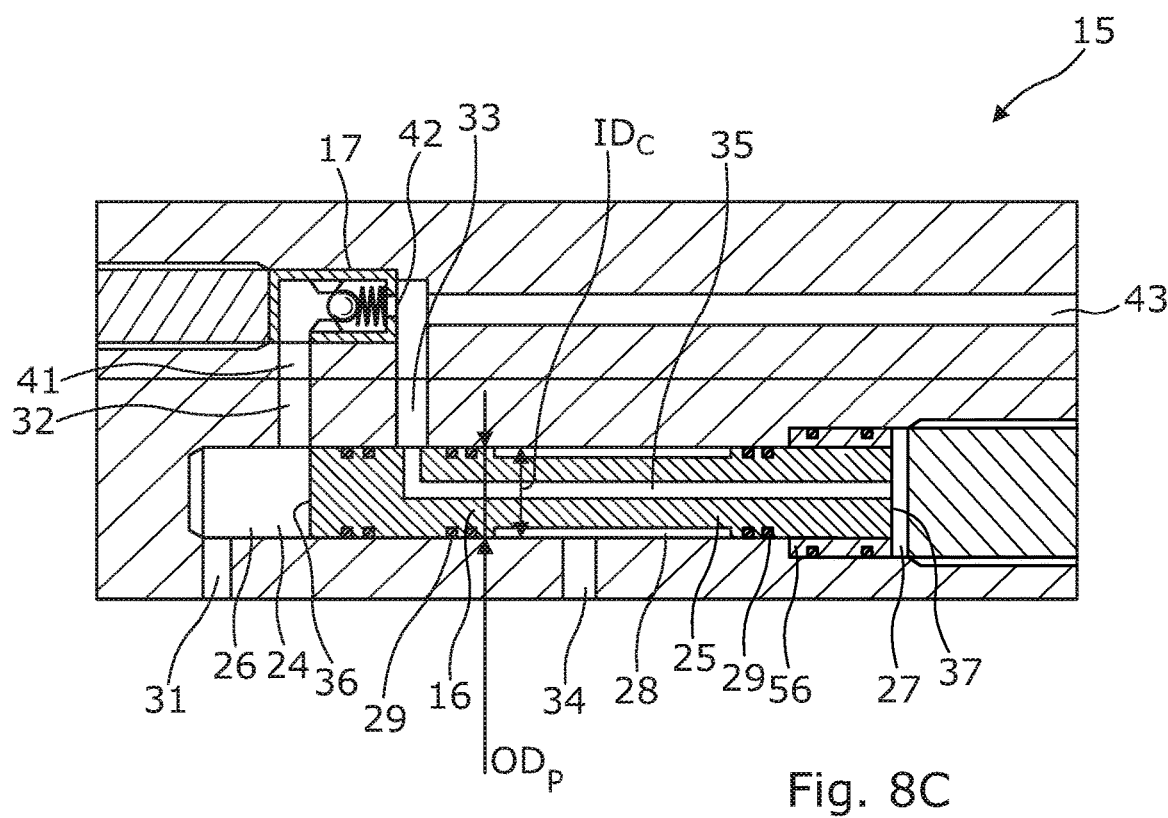
Figure 9A:
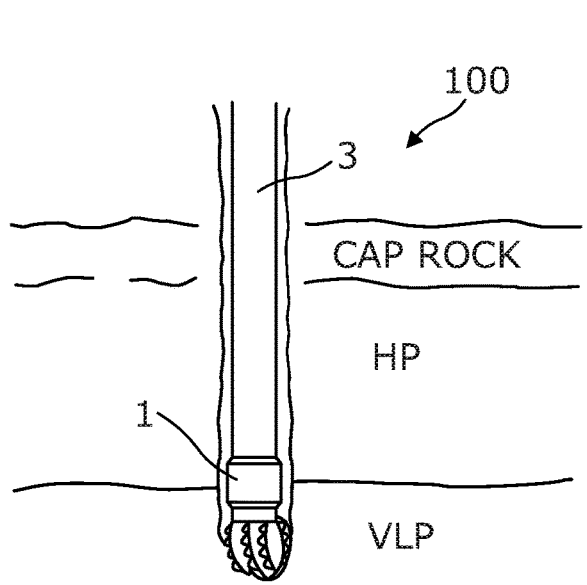
FIGS. 9A-C show the unexpanded annular barrier in the situation when drilling into a very low pressure zone experiencing "loss of pressure"
Figure 9B:
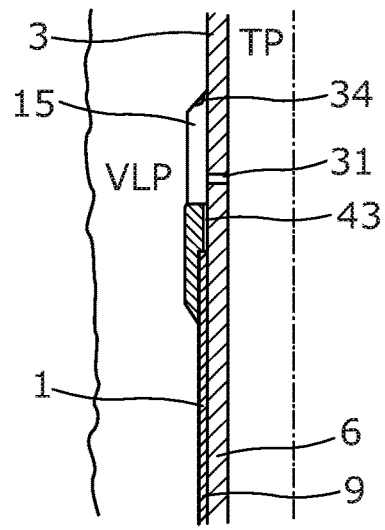
Figure 9C:
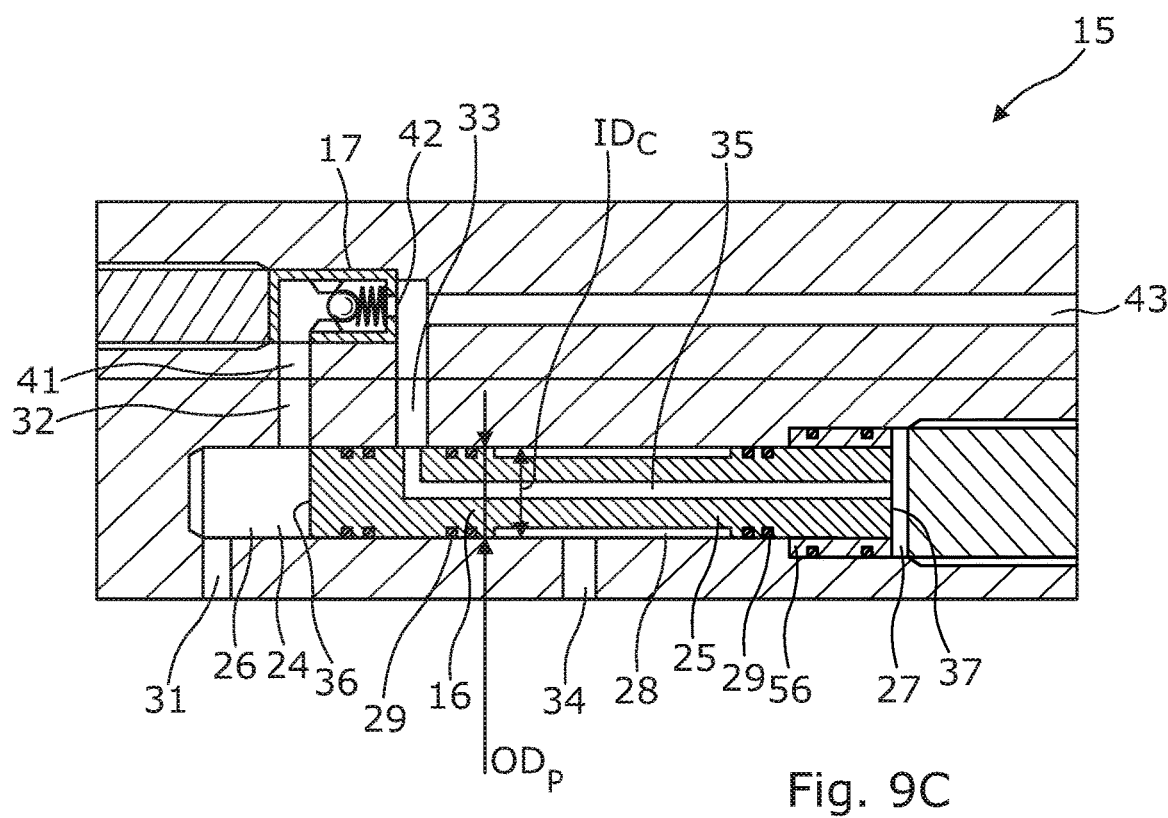
Figure 10A:
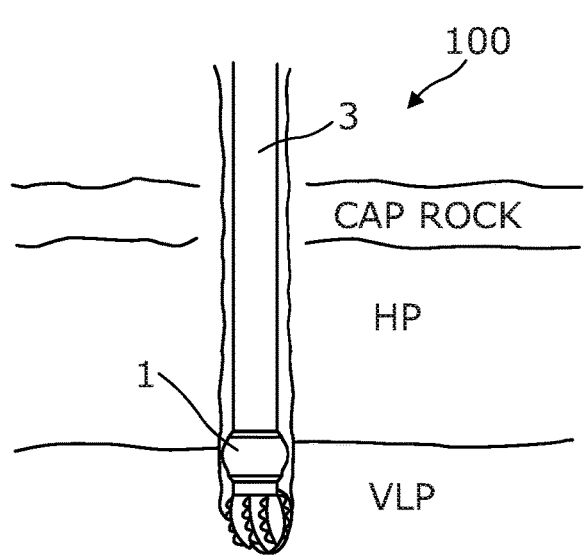
FIGS. 10A-C show the annular barrier being expanded during experiencing "loss of pressure"
Figure 10B:
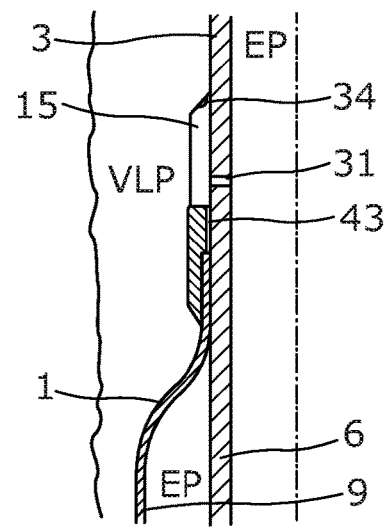
Figure 10C:
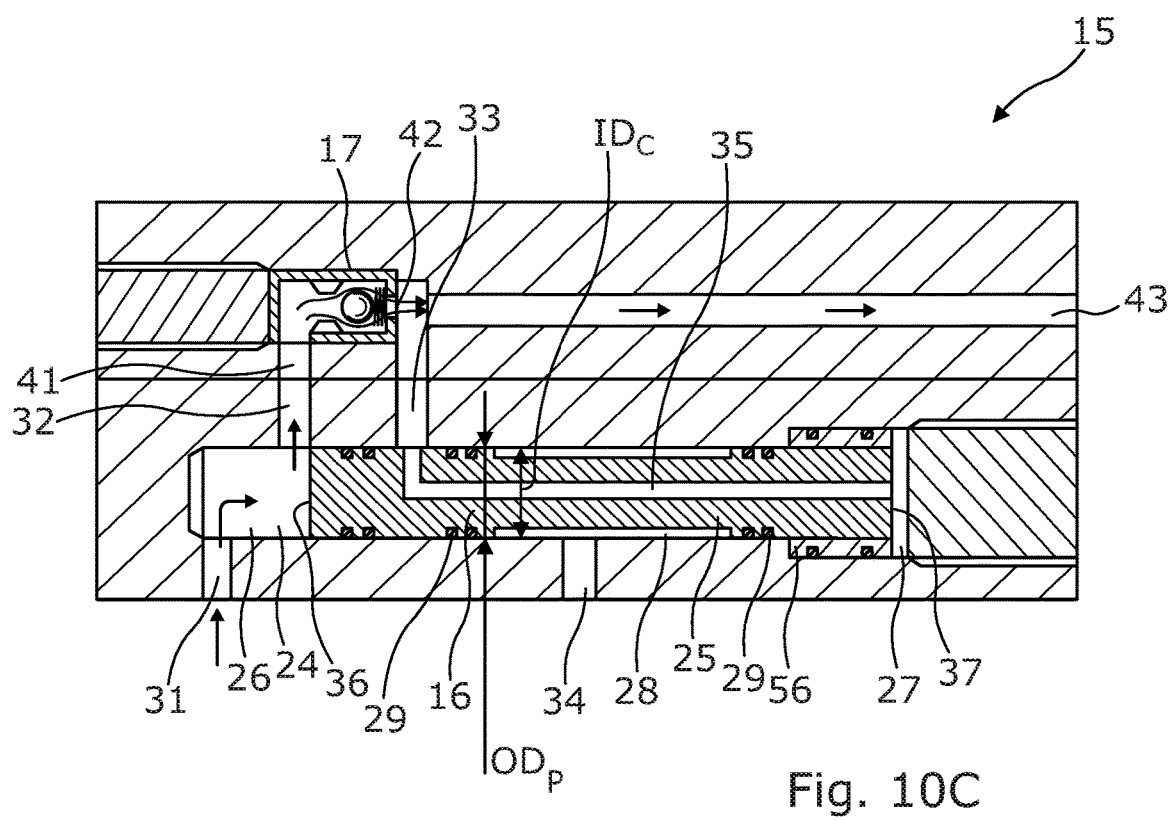
Figure 11A:
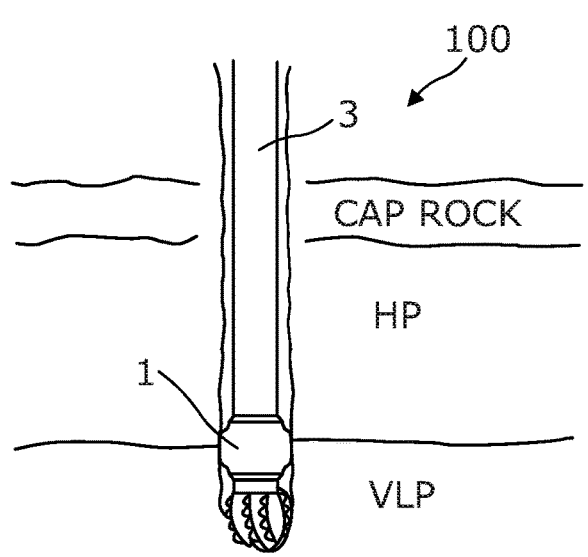
FIGS. 11A-C show the annular barrier after expansion during shifting the first valve from the first position to the second position.
Figure 11B:
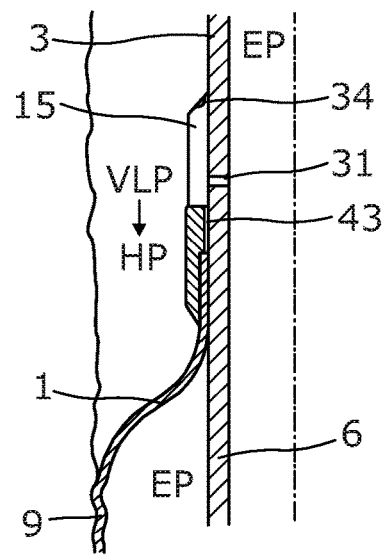
Figure 11C:
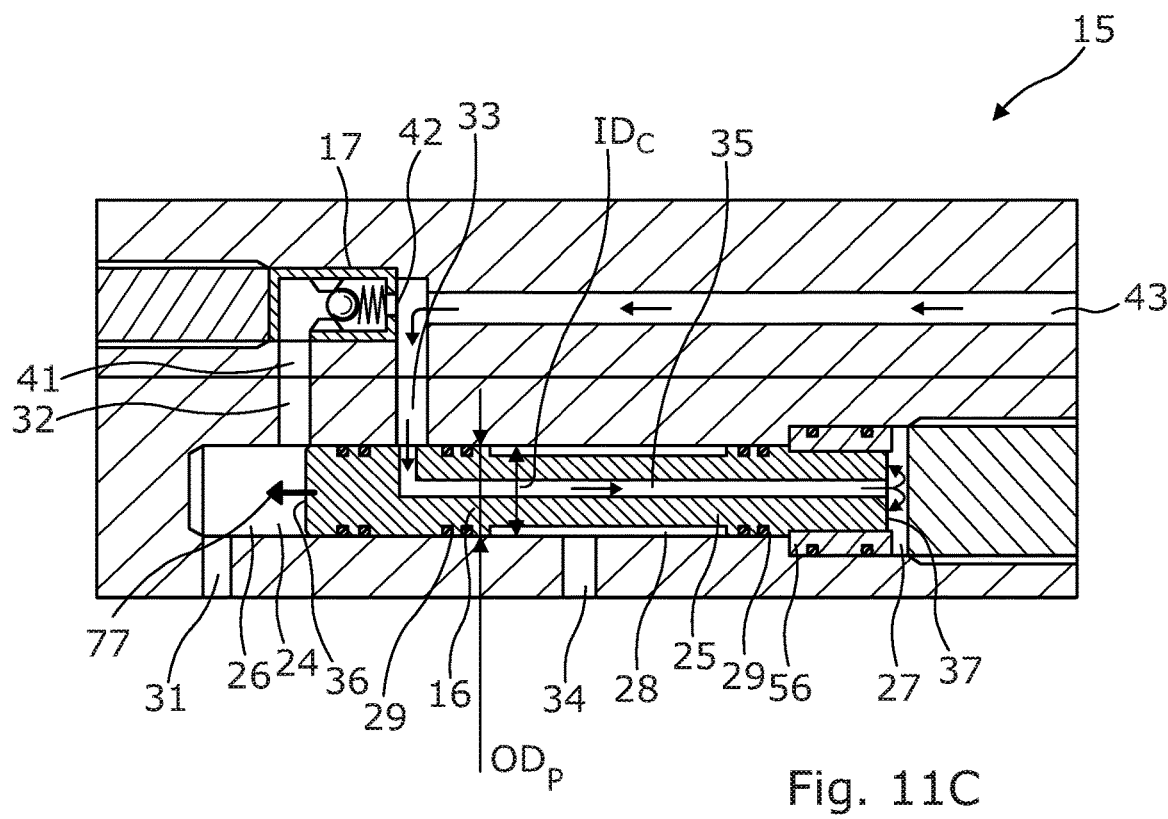
Figure 12A:
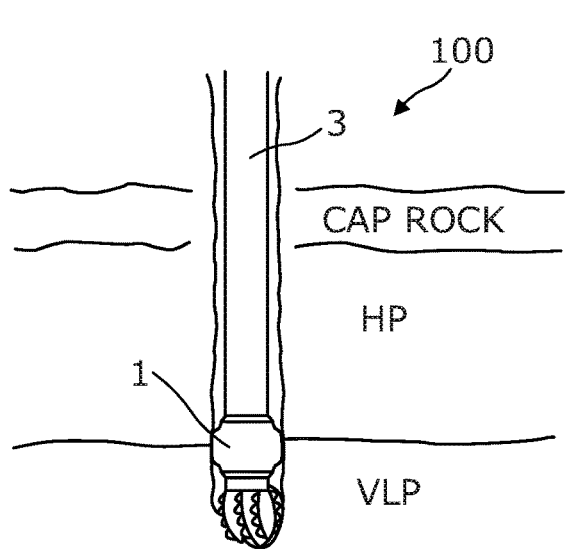
FIGS. 12A-C show the annular barrier isolating the top part of the annulus from the very low pressure zone.
Figure 12B:
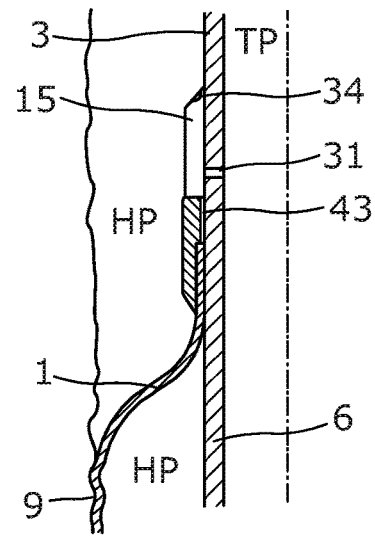
Figure 12C:
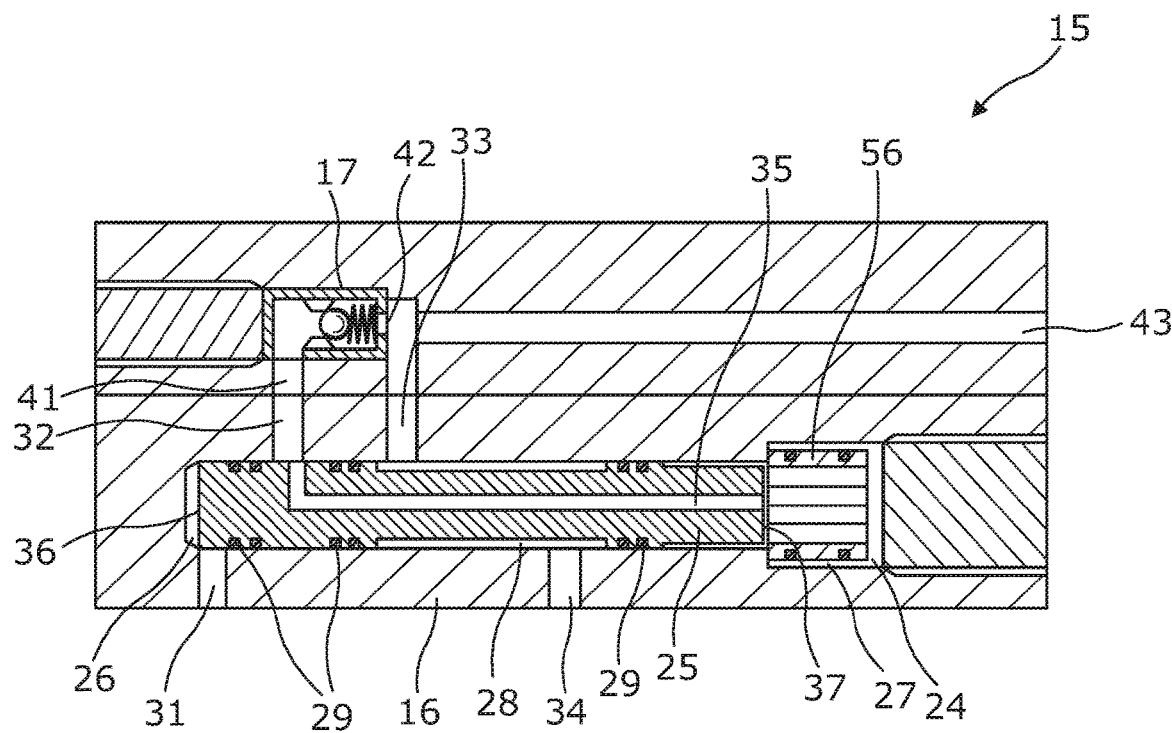

When completing a well having a high risk of "loss of pressure", i.e. the risk of drilling through a zone having a very low pressure (VLP), then during the drilling of a borehole in the formation through the cap rock and high pressure zone (HP) as shown in FIG. 8A, the annular barrier 1 is in its unexpanded position as shown in FIG. 8B and the first valve 16 is in its first position as shown in FIG. 8C. As the drilling continues, the drill string drills into a very low pressure zone in the formation, as shown in FIG. 9A, and the annular barrier 1 is still in its unexpanded position experiencing very low pressure (VLP) in the annulus, as shown in FIG. 9B, the first valve 16 is in its first position as shown in FIG. 9C. Then the drilling operation is stopped and a closing element, such as a ball, is dropped into the well tubular structure 3 to close the well tubular structure below the annular barrier 1, as shown in FIG. 10A. Subsequently as shown in FIG. 10B, the inside pressure (TP) of the well tubular structure is increased to the expansion pressure (EP) and expansion of the annular barrier just above or partly overlapping the low pressure zone occurs. The flow of fluid through the valve system 15 during expansion is disclosed by means of arrows in FIG. 10C where the pressurised fluid having expansion pressure flows in through the first aperture 31 and through the second valve and into the annular space through channel 43. After expansion as shown in FIGS. 11A and 11B, the inside pressure (TP) is decreased to a pressure below the space pressure, which is maintained at the expansion pressure (EP) as the second valve does not allow the fluid to flow back into the inside, and the space pressure being equal to expansion pressure (EP) causes the piston 25 of the first valve 16 of FIG. 11C to shift position from the first position to the second position as the space pressure being substantially equal to the expansion pressure (EP) presses onto the second end 37 of the piston and forces the piston to shift position and close the expansion opening. The annulus pressure above the annular barrier increases since the annular barrier isolate the upper annulus from the very low pressure. The flow of fluid having expansion pressure (EP) is shown by means of arrows in FIG. 11C and the piston 25 moves towards the first aperture 31 as illustrated with a arrow 77 and the piston moves to its closed position being the second position shown in FIG. 12C. Hereby, the well tubular structure is permanently closed and fluid communication between the annular space and the annulus is provided, so that in the event that a pressure difference arises between the annular space and the annulus, then the pressure difference there between can be equalised to prohibit collapse of the expandable metal sleeve 9 of the annular barrier 1. The annular barrier 1 of FIG. 12A thus isolates the very low pressure zone (VLP) and due to the equalisation, the expandable metal sleeve 9 of FIG. 12B is subjected to the same pressure as the high pressure (HP) above the annular barrier which is higher than the very low pressure (VLP) below the annular barrier.

In another embodiment, the well tubular structure is a production casing having a production opening or a production zone which may be provided with an inflow control valve, screens etc. The well tubular structure may also comprise a cement port or a fracturing port.

Completing the well using the downhole system may further comprise oscillating or rotating at least part of the well tubular structure in relation to the annular barrier while cementing, after expansion of the expandable metal sleeve of the annular barrier. After cementing the annulus between the well tubular structure and the wall of the borehole above the annular barrier, the completion may continue by drilling past the low pressure zone.

The expandable metal sleeve may be of metal, and the tubular part may be of metal so that the annular barrier is substantially of metal. The annular barrier may comprise sealing elements arranged on the outer face of the expandable metal sleeve. The well tubular structure is of metal and is substantially a well tubular metal structure. The well tubular structure may have some parts or components fully or partly of non-metal.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a well tubular structure, liner, casing or production casing is meant any kind of pipe, tubing, tubular, liner, string etc. used downhole in relation to oil or natural gas production.

Although the invention has been described in the above in connection with preferred embodiments of the invention, it will be evident for a person skilled in the art that several modifications are conceivable without departing from the invention as defined by the following claims.

The invention claimed is:

1. An annular barrier for being expanded in an annulus between a well tubular structure and a wall of a borehole downhole for isolating a first zone from a second zone in the annulus between the well tubular structure and the wall of the borehole, the annulus having an annulus pressure, the annular barrier comprising:
   a tubular part for being mounted as part of the well tubular structure, the tubular part comprising an opening and an inside having an inside pressure,
   an expandable metal sleeve surrounding the tubular part and having an inner face facing the tubular part and an outer face facing the wall of the borehole,
   each end of the expandable metal sleeve being connected with the tubular part,
   an annular space between the inner face of the expandable metal sleeve and the tubular part, the annular space having a space pressure, and
   a valve system comprising a first valve and a second valve, the second valve allowing pressurised fluid into the annular space to expand the expandable metal sleeve and preventing fluid from flowing from the annular space to the inside of the tubular part,
wherein the first valve has a first position allowing fluid communication between the inside of the tubular part and the second valve in order to expand the expandable metal sleeve to achieve an expanded position when increasing the inside pressure, and a second position providing fluid communication between the annular space and the annulus, wherein the first valve is configured to shift from the first position to the second position due to differential pressure when the space pressure is higher than the inside pressure, wherein the expandable metal sleeve is in the expanded position when the first valve is in the second position.

2. An annular barrier according to claim 1, wherein the second valve is arranged in a channel fluidly connecting the opening with the annular space.

3. An annular barrier according to claim 1, wherein the first valve comprises a chamber and a piston dividing the chamber into a first chamber section and a second chamber section and the piston is movable within the chamber to shift position.

4. An annular barrier according to claim 3, wherein the first valve has a first aperture being in fluid communication with the inside, a second aperture being in fluid communication with the second valve, a third aperture being in fluid communication with the annular space and a fourth aperture being in fluid communication with the annulus, and in the first position the first aperture is in fluid communication with the second aperture, and in the second position the third aperture is in fluid communication with the fourth aperture.

5. An annular barrier according to claim 4, wherein the piston comprises a fluid channel providing fluid communication between the third aperture and the second chamber section in the first position.

6. An annular barrier according to claim 4, wherein the piston has a recess providing fluid communication between the third aperture and the fourth aperture in the second position.

7. An annular barrier according to claim 3, further comprising a locking element adapted to mechanically lock the piston when the piston is in the closed position, blocking the opening.

8. An annular barrier according to claim 1, further comprising an anti-collapsing unit comprising an element movable at least between a first position and a second position, the anti-collapsing unit having a first port which is in fluid communication with the first zone of the annulus, and a second port which is in fluid communication with the second zone of the annulus, and the anti-collapsing unit having a third port which is in fluid communication with the annular space, and in the first position, the first port is in fluid communication with the third port, equalising the pressure of the first zone with the space pressure, and in the second position, the second port is in fluid communication with the third port, equalising the pressure of the second zone with the space pressure.

9. A downhole system for completing a well in a formation having layers of varying pressures, comprising:
    the well tubular structure, and
    at least one annular barrier according to claim 1.

10. A downhole system according to claim 9, wherein the well tubular structure is a drilling liner connected with a drilling head in a first end.

11. A downhole system according to claim 9, wherein the at least one annular barrier is arranged closer to the first end than to the second end of the well tubular structure.

12. A downhole system according to claim 9, wherein the well tubular structure is a production casing.

13. A drilling method for drilling past a low pressure zone in a formation, comprising:
    drilling a borehole in the formation,
    determining a low pressure zone in the formation,
    dropping a closing element into the well tubular structure,
    increasing the inside pressure of the well tubular structure and expanding the annular barrier according to claim 1 in the low pressure zone, and
    decreasing the inside pressure to a pressure below the space pressure and shifting the position of the first valve from the first position to the second position.

14. A drilling method according to claim 13, further comprising equalising the pressure between the annulus and the annular space.

15. A drilling method according to claim 13, further comprising providing cement above the annular barrier in an annulus between a casing and a wall of the borehole.

* * * * *